United States Patent [19]
Braun et al.

[11] Patent Number: 4,953,069
[45] Date of Patent: Aug. 28, 1990

[54] METHOD OF OPERATING A THREE-STEP INVERTER

[75] Inventors: Michael Braun, Herzogenaurach-Niederndorf; Hans-Dieter Heining, Nuremberg, both of Fed. Rep. of Germany

[73] Assignee: Siemens Aktiengesellschaft, Berlin & Munich, Fed. Rep. of Germany

[21] Appl. No.: 400,327

[22] Filed: Aug. 30, 1989

[30] Foreign Application Priority Data

Aug. 30, 1988 [EP] European Pat. Off. ........ 88114137.8

[51] Int. Cl.$^5$ ........................................... H02M 7/515
[52] U.S. Cl. ...................................... 363/41; 363/96; 363/136; 363/58; 318/801
[58] Field of Search ..................... 363/41, 43, 95, 96, 363/135, 136, 137, 138, 56, 57, 58; 318/800, 801, 802

[56] References Cited

U.S. PATENT DOCUMENTS

| | | | |
|---|---|---|---|
| 4,286,317 | 8/1981 | Kommissari | 363/136 |
| 4,386,396 | 5/1983 | Anquist | 363/136 |
| 4,536,816 | 8/1985 | Matsumura et al. | 363/58 |
| 4,855,893 | 8/1989 | Kratz | 363/58 |

Primary Examiner—Peter S. Wong
Attorney, Agent, or Firm—Kenyon & Kenyon

[57] ABSTRACT

A method of operating a three-step inverter that supplies a polyphase machine whose electric output variables are formed by scanning two zero-shifted setpoint signal sets with triangular modulation signal, in a space vector representation using double modulation. A first or second interval value is formed between the maximum or minimum value of phase signal waveforms of the setpoint signal sets and an upper or lower scanning limit. The first and second interval values are added or subtracted from the phase signal waveforms of the first and second setpoint signal sets, to thereby increase the linear control range of the inverter and reduce the harmonic spectrum in the inverter output signals.

9 Claims, 9 Drawing Sheets

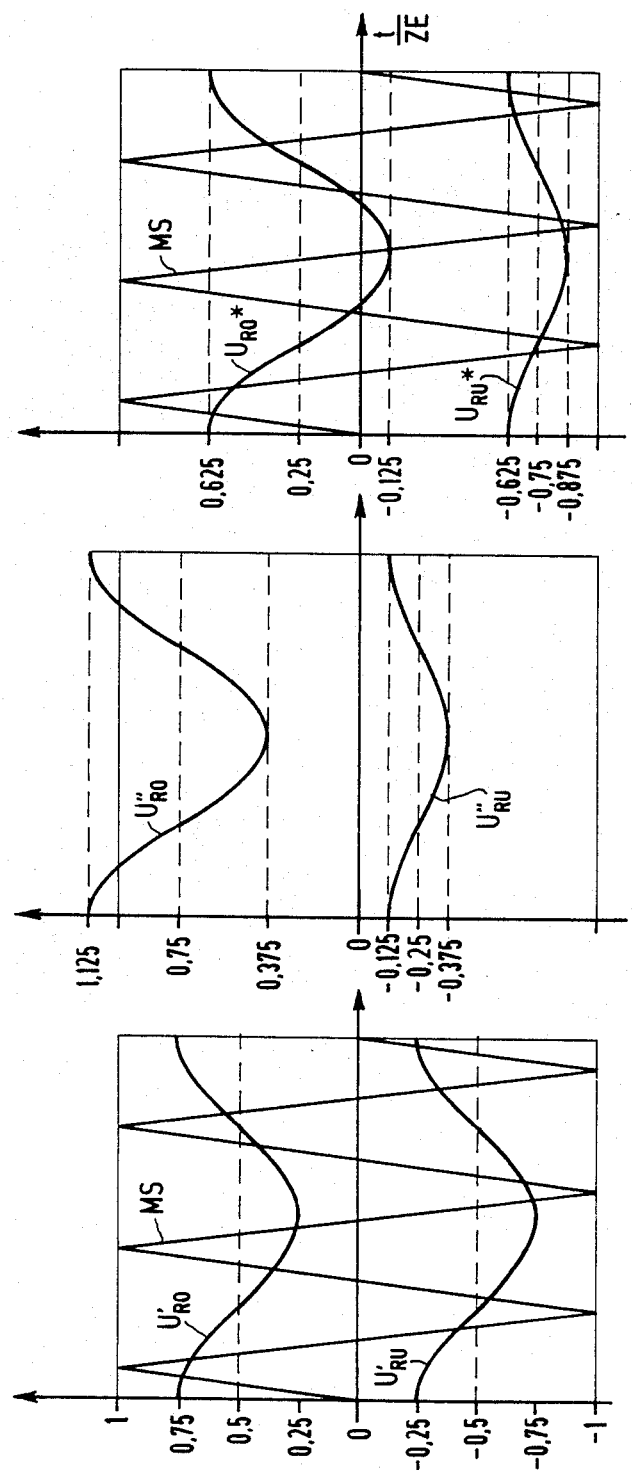
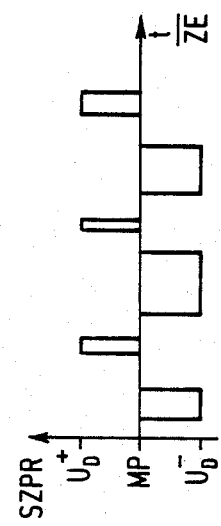
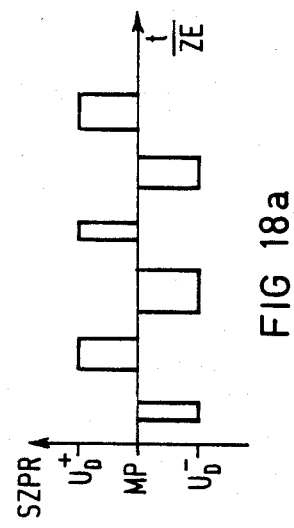
FIG 18c
FIG 18b
FIG 18a

1

METHOD OF OPERATING A THREE-STEP INVERTER

FIELD OF THE INVENTION

The invention relates to a method for operating a three-step inverter in which firing pulses for the valves in the phases of the inverter are formed from a triangular modulation signal scanning first and second cophasal setpoint signal sets, where each set comprises sinusoidal phase signal waveforms. The median line for the waveforms of the first setpoint signal set is equal to or greater than the value of the median line for the waveforms of the second setpoint signal set.

BACKGROUND OF THE INVENTION

A known advantage of a three-step inverter compared to a two-step inverter is that the three-step inverter has available three direct voltage potentials to simulate approximately sinusoidal voltages at the inverter output. Thus, the phases of a three-step inverter are supplied both by the positive or negative potential, of a direct voltage source and by a central potential, preferably corresponding to the zero potential. At the input of the three-step inverter, this central potential connection is made available as a "floating zero point" at the interconnection point of two intermediate circuit capacitors fed by the direct voltage source. It is also possible to form the three direct voltage potential by an alternating current transformer set up accordingly with downstream inverter configurations for the positive and negative potentials relative to the central potential.

In the inverter of FIG. 1, to form approximately sinusoidal voltages at outputs R, S, and T of the phases PR, PS, PT, the three direct voltage potentials $U_{D+}$, $U_{D-}$, MP are coupled through particular circuit elements in each phase of the three-step inverter for specific amounts of time at the respective output. In the phase PR, illustrated as an example in FIG. 1, these particular circuit elements are shown as T1 to T4, which are provided with antiparallel recovery diodes and arranged in series between the positive potential $U_{D+}$ and the negative potential $U_{D-}$. The interconnection points between T1 and T2 or T3 and T4 are coupled in a series arrangement through two coupling diodes and the central potential connection MP of the direct voltage source.

When three-phase machines are supplied with frequency controllable converters, it is advantageous to represent the electrical variables, especially the voltages and currents generated by the converter in the electrical machine, in the form of space vectors in a rectangular $\alpha,\beta$-coordinate system relating to the stator of the electrical machine. The publication "Raumzeiger Modulation bei Frequenzumrichtern" (The Modulation of Space Vectors with Frequency Converters), Antriebstechnik (Drive Engineering) 27 (1988) No. 4, pp. 38 to 42, briefly describes this method of space vector representation and the "space vector modulation" resulting therefrom. The space vector modulation is a result of a known subharmonic process used in inverter operation. The publication describes the method of space vector representation using the example of an asynchronous machine fed by a two-step inverter.

Due to the limited number of possible circuit state combinations of the valves in the inverter, the voltage space vector can initially only occupy discrete positions in the $\alpha,\beta$-coordinate system. Such a coordinate system is shown as an example in FIG. 2. The peaks of the discrete, permissible positions of the voltage space vector $\underline{U}^*$, which can be generated by a three-step inverter, are denoted with rectangles and marked with the numbers 1 to 27. The circuit state of the three-step inverter required to generate the respective positions is represented graphically inside these rectangles. Inside each rectangle, three switches are represented. The switches symbolize the phases of a three-step inverter and each can represent three possible circuit states.

For example, if a phase switch points upwards, then the potential $U_{D+}$ is connected to the output R by bringing the valves T1 and T2 into circuit in the phase PR. If, in comparison, the phase switch lies horizontally, then by bringing the valves T2 and T3 into circuit, the central potential MP is connected to the output R. Finally, if such a phase switch points downwards, then, for example, by bringing valves T3 and T4 into circuit, the potential $U_{D-}$ is connected to the respective phase output.

To generate a voltage space vector with switch settings as shown in position 1, the phase switch SP for the phase PR must point upwardly and both phase switches SS, ST for the phases PS, PT must point downwardly. In this case, the potential $U_{D+}$ is coupled to the output R of the phase PR, and the potential $U_{D-}$ is coupled to the outputs S, T of the phases PS, PT. One can see from the representation in FIG. 2, that some circuit states are equivalent, that is they generate the same voltage space vector in the $\alpha,\beta$-coordinate system. Thus, for example, the circuit states 16 and 22 produce the same voltage space vector rotated 60° compared to the $\alpha$-coordinate axis.

It is often necessary to generate voltage space vectors which do not conform with the above described discrete positions and therefore lie inside of the equilateral triangles fixed by the discrete circuit states 1 to 27 in the $\alpha,\beta$-coordinate system. For this purpose, with the help o the pulse modulation process known as the subharmonic process, connections are made back and forth cyclically with a certain switching ratio between discrete space vector positions. This is also known as space vector modulation. Thus, to generate the space vector $\underline{U}^*_1$ shown in FIG. 2, it is possible, for example, to couple back and forth cyclically between the circuit states 1, 9, 16, 22, 15, 21 and 14. As a result of superimposing discrete space vector positions in this manner any space vector intermediate position can be approximated in the time average.

From the publication "A novel approach to the generation and optimization of three level PWM wave forms", PESC '88 Record, IEEE, April 1988, pp. 1255 to 1262 (especially FIG. 5), a special form of space vector modulation for three step inverters is described, which is known as double modulation. A periodic waveform, corresponding to the known subharmonic process comprising linear parts, serves as a modulation signal, whose maxima and minima specify a preferably standardized upper and lower scanning limit. FIG. 3 shows, as an example, such a modulation signal MS, which is preferably triangular. Its extremes define the preferably standardized upper or lower scanning limit +1.0 or −1.0, shown as broken lines.

In accordance with double modulation, to form the switching pulses for the valves in the phases of the three-step inverter, two separate, cophasal setpoint signal sets, which are not phase displaced relative to each other, are scanned by the modulation signal. An example of two such three-phased setpoint signal sets are shown in FIG. 3. They are designated as first and second setpoint signal sets and each set comprises three sinusoidal phase signal waveforms, electrically phase shifted from each other by 120°, $U^*_{RO}, U^*_{SO}, U^*_{TO}$ and $U^*_{RU}, U^*_{SU}, U^*_{TU}$. Thus, corresponding phase signal waveforms in both setpoint signal sets, i.e., the waveforms $U^*_{RO}$ and $U^*_{RU}$, are cophasal to each other. The phase signal waveforms of the first setpoint signal set lie, as a rule, in the upper range of the modulation signal, while the phase signal waveforms of the second setpoint signal set lie in the lower range. The value of the median line MLO of the phase signal waveforms of the first setpoint signal set is greater than or equal to the value of the median line MLU of the phase signal waveforms of the second setpoint signal set. In the example of FIG. 3, the phase signal waveforms of the first and second setpoint signal sets are provided with median lines MLO, MLU with the values +0.5, −0.5, and are scanned by a standardized modulation signal MS, which has a range of 2.

There is a need for a method to use the double modulation process to operate a three-step inverter, so that the electric variables at the output of the three-step inverter are provided with a harmonic spectrum that is favorable for an electrical machine that is supplied as a load.

SUMMARY OF THE INVENTION

This and other needs are met by the present invention which provides a method of forming firing pulses for valves in the phases of a three-step inverter. First and second co-phasal setpoint signal sets comprising sinusoidal phase signal waveforms are provided. The median line for the phase signal waveforms of the first setpoint signal set are greater than or equal to the median line for the phase signal waveform of the second setpoint signal set. A modulation signal is provided with a range that defines upper and lower scanning limits. A first interval value is created which represents a difference between an instantaneous maximum value of the phase signal waveforms of the first setpoint signal set and the upper scanning limit. A second interval value is created which represents a difference between an instantaneous minimum value of the phase signal waveforms of the second setpoint signal set and the lower scanning limit. The phase signal waveforms of the first setpoint signal set are decreased by the first interval value when the values of the phase signal waveforms exceed the upper scanning limit&. The phase signal waveforms of the second setpoint signal set are reduced by the second interval value when their values fall below the lower scanning limit. Scanning of the phase signal waveforms of the first and second setpoint signal sets is performed by the modulation signal.

Another method of forming firing pulses for the valves in the aforementioned three-step inverter comprises providing first and second cophasal setpoint signal sets, each setpoint signal set having sinusoidal phase signal waveforms with median lines. The median line for the phase signal waveforms of the first setpoint signal set are greater than or equal to the median line of the phase signal waveforms of the second setpoint signal set. A modulation signal is provided with a range that defines upper and lower scanning limits. A first difference value represents the difference between an instantaneous maximum of the phase signal waveforms of the first setpoint signal set and the median line for the phase signal waveforms of the first setpoint signal set. A second difference value represents the difference between an instantaneous minimum value and the phase signal waveforms of the second setpoint signal set and the median line for the phase signal waveforms of the second setpoint signal set. The phase signal waveforms of the first setpoint signal set is multiplied with the range of the modulation signal. The phase signal waveforms of the first setpoint signal set is multiplied with the range of the modulation signal. The phase signal waveforms of the second setpoint signal set is multiplied with the range of the modulation signal. The first difference is subtracted from the multiplied phase signal waveforms of the first setpoint signal sets. The second difference is subtracted from the multiplied phase signal waveforms of the first and second setpoint signal sets. The phase signal waveforms of the first setpoint signal set are zero shifted so that the median line of the phase signal waveforms of the first setpoint signal set is at the upper scanning limit. The phase signal waveforms of the second setpoint signal set are zero shifted so that the median line of the phase signal waveforms of the second setpoint signal set is at the lower scanning limit. Scanning of the phase signal waveforms of the first and second setpoint signal sets is performed by the modulation signal.

BRIEF DESCRIPTION OF THE DRAWINGS

FIG. 18a, b, c illustrate the formation of a window from one phase signal waveform from each of a first and second setpoint signal set using the load distribution of FIG. 17.

DETAILED DESCRIPTION

Figure 1:
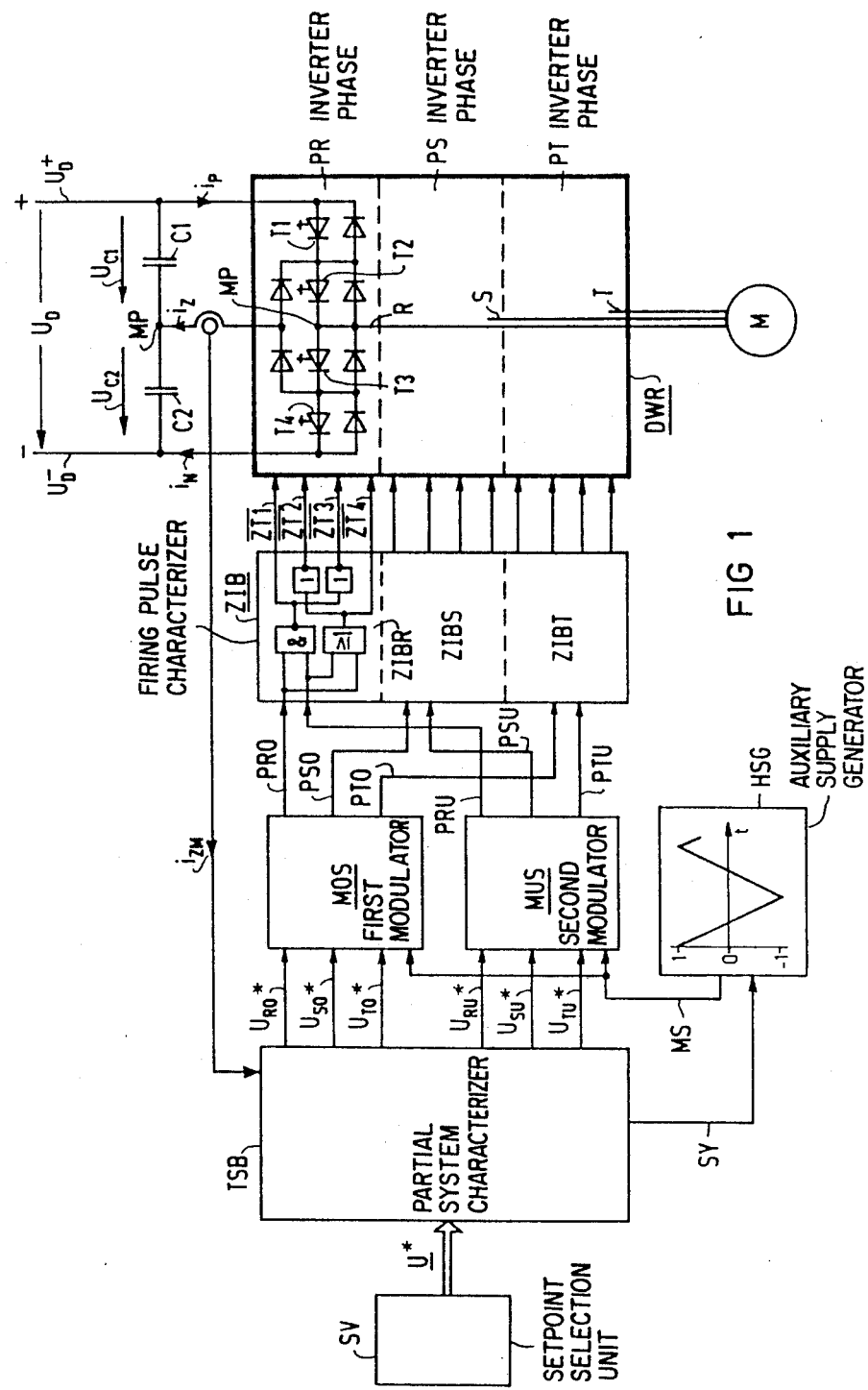
FIG. 1 is a block diagram of a firing circuit subassembly for a three-step inverter constructed according to an embodiment of the present invention to double modulation.

FIG. 1 is the block diagram of a firing circuit subassembly for operating a three-step inverter DWR according to the double modulation principle. A setpoint selection unit SV sets a desired voltage space vector $\underline{U}^*$ for a three phase machine M operated as a load from the three-step inverter DWR. In a partial system characterizer TSB, this setpoint voltage space vector is split into first and second setpoint signal sets, in accordance with double modulation. Each of the two setpoint signal sets comprise one set of three phase signal waveforms $U^*_{RO}$, $U^*_{SO}$, $U^*_{TO}$, or $U^*_{RU}$, $U^*_{SU}$, $U^*_{TU}$, electrically phase-shifted relative to each other by 120°. An auxiliary supply generator HSG provides modulation signal MS for scanning the phase signal waveforms of the setpoint signal systems. In the following description, the phase signal waveforms are sinusoidal and the modulation signal is triangular, although other shapes for these signals are contemplated. By an additional signalling line SY coupling the partial system characterizer TSB to an auxiliary supply generator HSG, the waveform of the modulation signal can be synchronized with the phase signal waveforms of the setpoint signal sets.

The actual scanning of the desired setpoint signal sets takes place in first and second modulators MOS and MUS, respectively, by superimposing the appropriate phase signal waveforms with the modulation signal. The binary modulation pulses PRO, PSO, PTO and PRU, PSU, PTU at the output of MOS and MUS indicate if the modulation signal MS is larger or smaller than each specific phase signal waveform. The signals (switching pulses) for switching the valves in the inverter phases PR, PS, PT are made available by the individual sections ZIBR, ZIBS, ZIBT of a firing pulse characterizer ZIB. An example of switching pulses is shown in FIG. 1, these particular switching pulses ZT1 to ZT4 switching the valves T1 to T4 of the inverter phase PR on and off. The switching pulses ZT1 to ZT4 are formed in the section ZIBR of the firing pulse characterizer ZIB using the dual modulation pulses PRO and PRU formed from the modulation of the phase signal waveforms $U^*_{RO}$ and $U^*_{RU}$.

Figure 3:
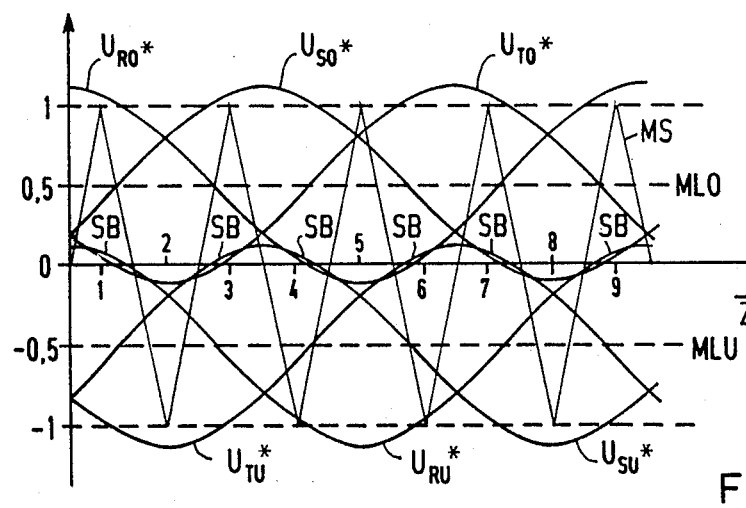
FIG. 3 is a graph illustrating the waveforms of a standardized, triangular modulation signal and of the phase signals of first and second setpoint signal sets used to operate a three-step inverter by double modulation, with the phase signal waveforms having a modulation amplitude of A =0.53.

The phase signal waveforms $U^*_{RO}$, $U^*_{SO}$, $U^*_{TO}$ and $U^*_{RU}$, $U^*_{SU}$, $U^*_{TU}$ of a first and second setpoint signal set, illustrated as an example in FIG. 3, have a modulation amplitude with the value A=0.53. In this case, the amplitude of each phase signal waveform is larger than half of the range of the standardized modulation signal MS, i.e., larger than the value 1.0.

Figure 2:
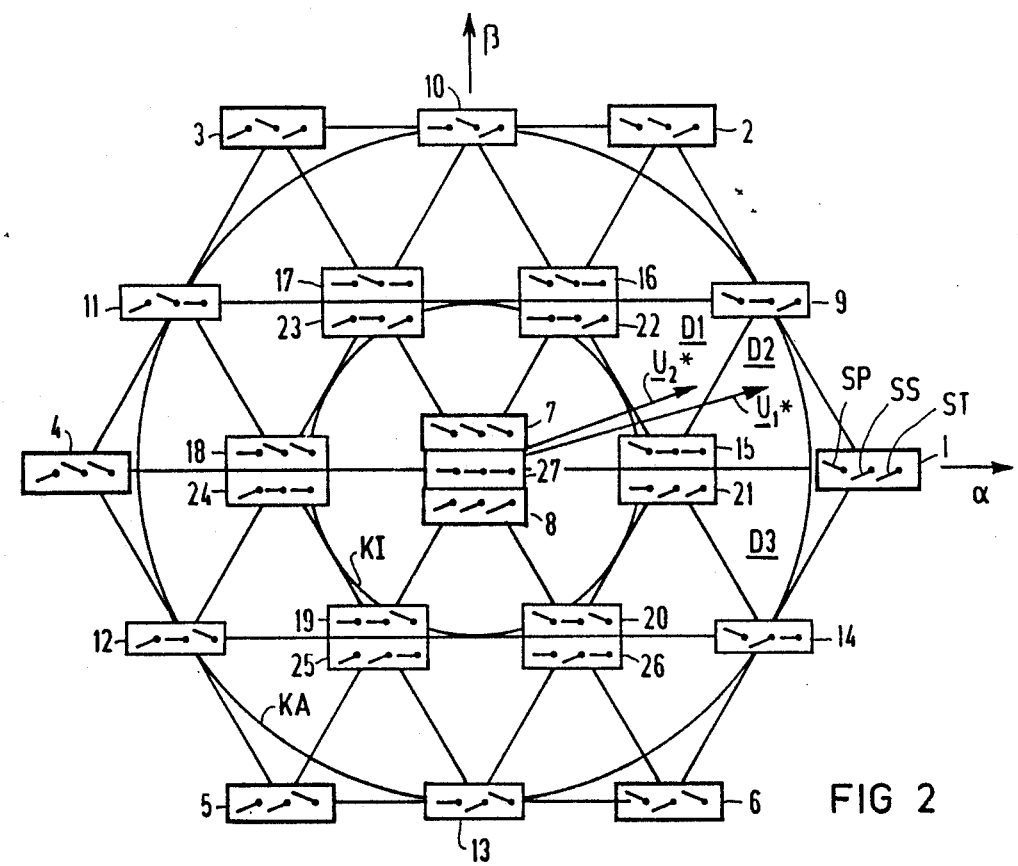
FIG. 2 schematically illustrates the discrete positions of exemplary voltage space vectors in the $\alpha,\beta$-coordinate system that can be generated using the three-step inverter of FIG. 1.

For a modulation amplitude with a value A=0.5, voltage space vectors would have a length corresponding to the radius of the circle K1 drawn in FIG. 2. For this modulation amplitude value, the maximum values of the phase signal waveforms of the first setpoint signal set and the minimum values of the phase signal waveforms of the second setpoint signal set would slightly exceed or fall below the upper scanning limit +1.0 or the lower scanning limit −1.0. However, the minimum values of the phase signal waveforms of the first setpoint signal set and the maximum values of the phase signal waveforms of the second setpoint signal set, near the coordinate zero line, would contact each other at their edges.

As the modulation amplitude is increased above the value A=0.5, the phase signal waveforms of both setpoint signal systems are increasingly superimposed. In the diagram of FIG. 3, this superimposition can be clearly recognized for a modulation amplitude value of A=0.53 by the appearance of intersection areas SB. The upper and lower scanning limits are defined by the peaks of the modulation signal MS. The appearance of intersection areas as well as exceeding or falling below the upper or lower scanning limits indicates that an overload exists. In the areas where the phase signal waveforms exceed the upper scanning limit or fall below the lower scanning limit, the maximum values or minimum values of the first or second setpoint signal sets are no longer scannable by the modulation signal MS. Thus, a modulation error occurs since the crests of the sinusoidal phase signal waveforms can no longer be scanned by the modulation signal. The result of this is a distortion of the electric signals at the output of the inverter. This distortion increases with the modulation amplitude, that is, the electric signals deviate more and more from the desired sinusoidal shape. These electric signals are consequently loaded with a harmonic spectrum that is increasingly unfavorable, especially for an electrical machine operated as a load. For this reason, for phase signal waveforms that cannot be properly scanned by the modulation signal, it is desirable to prevent the unfavorable effects of an overload on the harmonic spectrum of the inverter output signals.

Figure 5:
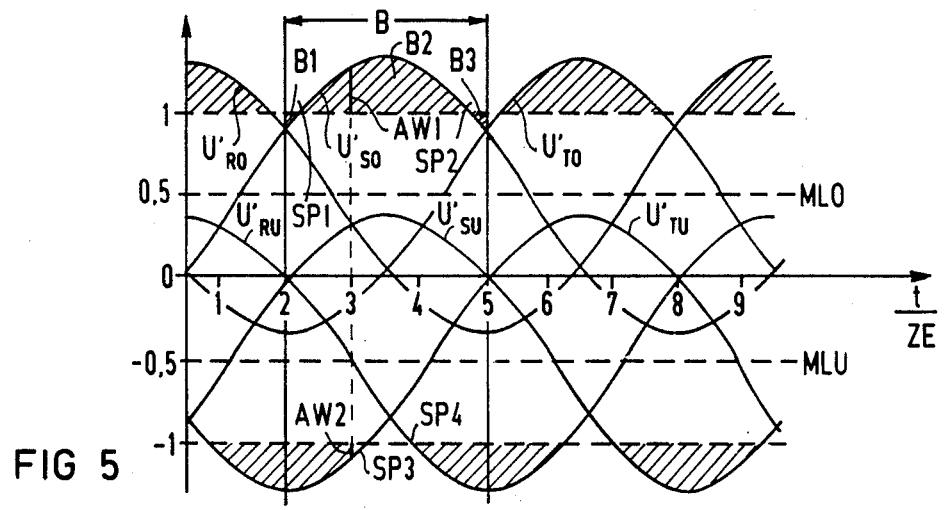
FIG. 5 is a graph illustrating the phase signal waveforms of a first and second setpoint signal set used to operate a three-step inverter by double modulation, having a modulation amplitude of A=0.75.

To accomplish this, the present invention provides that a first interval value is formed between the maximum values of the phase signal waveforms and the upper scanning limit, and a second interval value is formed between the minimum values of the phase signal waveforms and the lower scanning limit. As shown in FIG. 5, in an embodiment of the invention, all phase signal waveforms of the first setpoint signal set are decreased by the instantaneous magnitude of the first interval value while the upper scanning limit is being exceeded. At the same time, all phase signal waveforms of the second setpoint signal set are increased by the instantaneous magnitude of the second interval value while the signal falls below the lower scanning limit.

The phase signal waveforms $U'_{RO}$, $U'_{SO}$, $U'_{TO}$, and $U'_{RU}$, $U'_{SU}$, $U'_{TU}$ represented in FIG. 5 have a modulation amplitude with the value $A = 0.75$. With this modulation amplitude, the phase signal waveforms of the first setpoint signal set exceeds the upper scanning limit $+1.0$, while the phase signal waveforms of the second setpoint signal set fall below the lower scanning limit $-1.0$. Also, noticeable overlappings of the phase signal waveforms of both setpoint signal sets occur in the area of the zero line of the coordinate system. The areas of upper deviation or lower deviation of the scanning limits are represented as shaded areas in FIG. 5. In FIG. 5, the area marked "B" between two and five units of time ZE will be especially considered in the following. In area B, the first interval value, AW1, which occurs at three time units is shown as the interval between the instantaneous maximum value of the phase signal waveforms and the upper scanning limit $+1.0$. Also, the second interval value AW2 is shown as the interval between the instantaneous minimum value of the phase signal waveforms and the lower scanning limit $-1.0$. In accordance with the present invention, the phase signal waveforms of the first setpoint signal set are decreased by this first interval value AW1 while the phase signal waveforms of the second setpoint signal set are increased by this second interval value AW2.

This has as a result in FIG. 5, for example, that the phase signal waveform $U'_{SO}$ in the area B2 between the points of interception with the upper scanning limit SP1 and SP2 is limited to the value of the upper scanning limit $+1.0$. Accordingly, within the area B, the phase signal waveform $U'_{TU}$ in the area between two time units and the point of interception SP3, and the phase signal waveform $U'_{RU}$ in the area between the point of interception SP4 and five time units are limited to the value of the lower scanning limit $-1.0$. As a result of these limits, the range of the phase signal waveforms that form the respective maximum or minimum values in the first or second setpoint signal sets appear to have been lost. This range is, however, compensated in the remaining, unlimited phase signal waveforms of the respective setpoint signal sets, according to the present invention, by subtracting or adding the first or second interval value to the remaining phase signal waveforms. Thus, the linear range of modulation amplitude can be increased so &hat the electric signals at the output of the inverter will consequently deviate less from the desired sinusoidal shape and, as a result, have a favorable harmonic spectrum.

Figure 6:
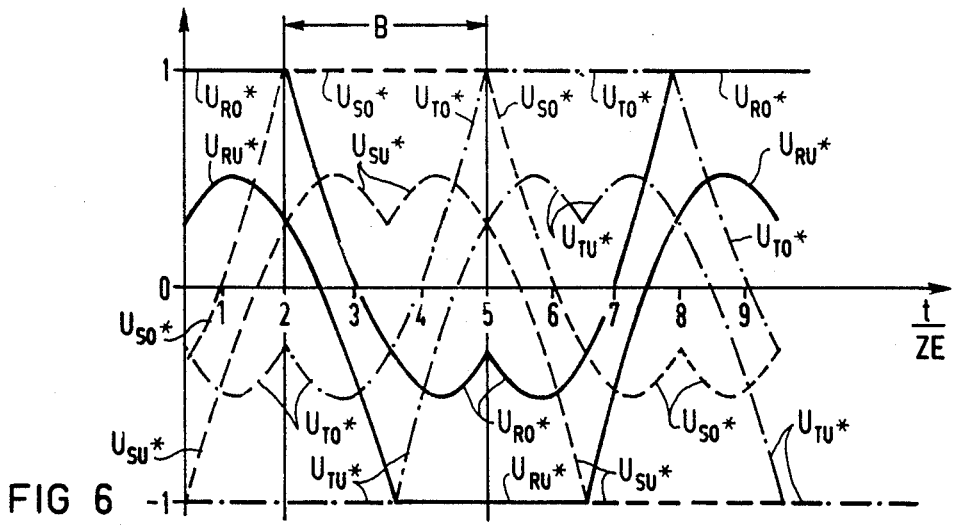
FIG. 6 illustrates optimized phase signal waveforms resulting from the phase signal waveforms of FIG. 5, according to the present invention, to qenerate electric variables favorable for harmonic oscillation at the inverter output.

In another embodiment of the invention, when exceeding or falling below the upper or lower scanning limit, the phase signal waveforms are corrected with the first or second interval value. The phase signal waveforms of the first setpoint signal set are increased by the first interval value and the phase signal waveforms of the second setpoint signal set are decreased by the second interval value. As a result, in area B of the waveforms represented in FIG. 5, the phase signal waveform $U'_{SO}$, besides being limited to the value $+1.0$ in the area B2 between SP1 and SP2, is also raised in area B1 which is between two time units and SP1 and area B3 which is between SP2 and five time units, to the value of the upper scanning limit $+1.0$. In the same way, in the area B, in addition to limiting the phase signal waveforms $U'_{RU}$ and $U'_{TU}$ to the value of the lower scanning limit $-1.0$ in the shaded areas, there is a reduction to the same value in the area between the points of interception SP3 and SP4. The waveforms of the phase signals $U^*_{RO}$, $U^*_{SO}$, $U^*_{TO}$ and $U^*_{RU}$, $U^*_{SU}$, $U^*_{TU}$ of the first and second setpoint signal system, resulting from this embodiment of the invention, are represented in FIG. 6. These signals are formed in the partial signal characterizer TSB, as shown in FIG. 1, and subsequently are made available in the same way to both modulators MOS and MUS for further processing. The corrected phase signal waveforms resulting from the process of the invention increase the linear range of modulation amplitude of the three-step inverter. Also, in the time average, the average switching rate between the discrete space vector positions, which is required to form the voltage space vectors lying in the $\alpha,\beta$-coordinate plane of FIG. 2, is reduced to approximately ⅔ of the original value.

Figure 4:
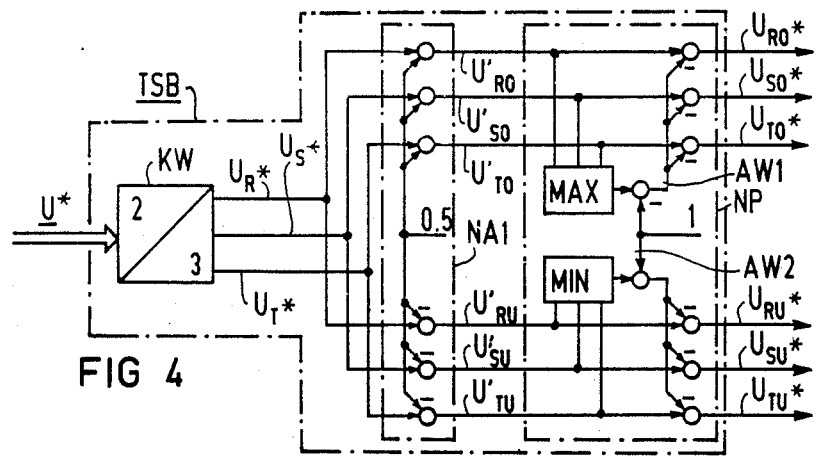
FIG. 4 is a block diagram of an embodiment of a partial system characterizer used in the inverter in FIG. 1.

In FIG. 4, an embodiment of a partial system characterized TSB for the three-step inverter, constructed in accordance with the invention, is shown in block diagram form. This embodiment comprises a coordinate transformer KW, a first zero phase sequence system adder NA1 and a zero phase sequence manipulator NP. A desired voltage space vector $\underline{U}^*$, which is provided as a setpoint value at the input of the partial system characterizer TSB, is initially converted into a three-phased setpoint signal system $U^*_R$, $U^*_S$, $U^*_T$ by the coordinate transfer KW. This serves as the starting point to form the first and second setpoint signal set for the double modulation. The actual branching into the phase signal waveforms $U'_{RO}$, $U'_{SO}$, $U'_{TO}$ of the first setpoint signal set and $U'_{RU}$, $U'_{SU}$, $U'_{TU}$ of the second setpoint signal set follows the first zero phase sequence system adder NA1. In the embodiment of FIG. 4, the setpoint signal set $U^*_R$, $U^*_S$, $U^*_T$ is increased or lowered (i.e., zero-shifted) by the value 0.5. As seen in the diagrams of FIGS. 3 and 5, the resulting phase signal waveforms of the first setpoint signal set proceed around a first median line MLO lying at $+0.5$, while the phase signal waveforms of the second setpoint signal set proceed around a second median line lying at $-0.5$.

The setpoint signal systems, zero-shifted as above, are corrected in the zero phase sequence system manipulator NP. For this purpose, a maximum or minimum value detector MAX or MIN measures the instantaneous maximum or minimum value of the phase signal waveforms. The first interval value AW1 which has a positive sign, is thereby formed by subtracting the amount of the upper scanning limit from the detected maximum value. The second interval value AW2, which has a negative sign, is formed by adding the amount of the lower scanning limit to the detected minimum value. To form the corrected output signals of the partial system characterizer TSB, the first and second interval values are subtracted from the phase signal waveforms of the first and second setpoint signal sets respectively.

Figure 7:
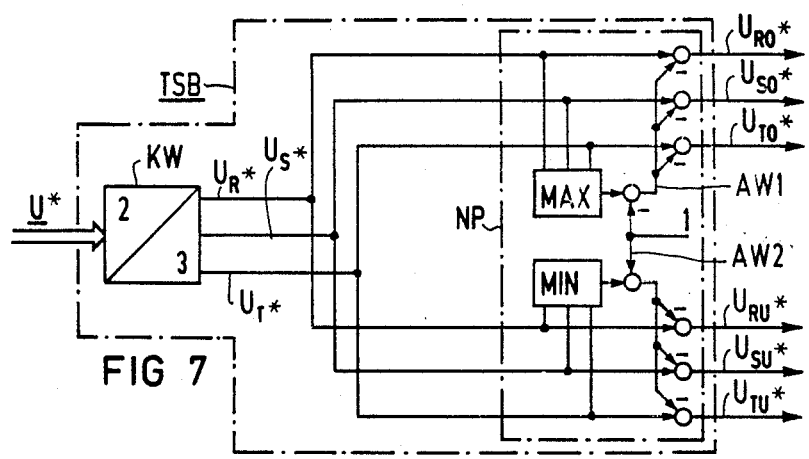
FIG. 7 is a block diagram of another embodiment of a partial system characterizer used in the three-step inverter of FIG. 1.
Figure 8:
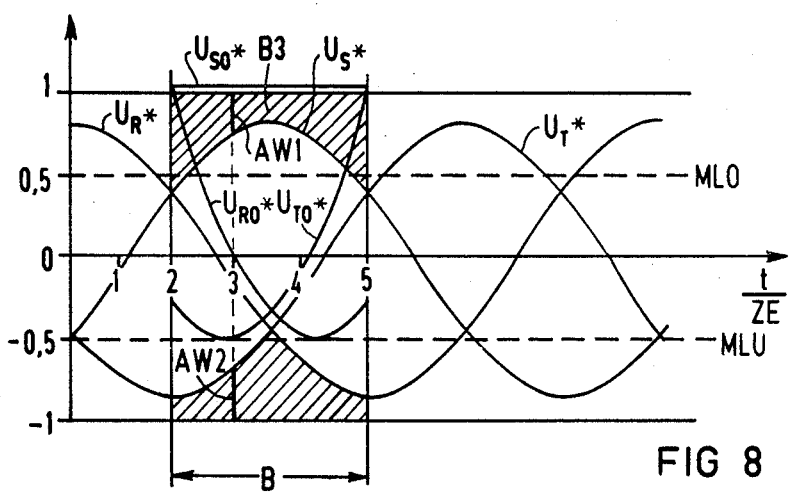
FIG. 8 illustrates an example of the formation of a window from the phase signal waveforms of the first setpoint signal set according to FIG. 6.

In another embodiment of the invention, there is no previous branching of the setpoint signal set $U^*_R$, $U^*_S$, $U^*_T$ into two different setpoint signal sets, in accordance with the double modulation. Instead, this setpoint signal set represents two setpoint signal sets that are already superposed with initially identical median lines conforming to the zero line. Thus, it is possible, using the embodiment of the partial system characterizer TSB shown in the block diagram of FIG. 7, to produce the three-phase setpoint signal set $U^*_R$, $U^*_S$, $U^*_T$ twice at the output of the coordinate transformer KW, without previous zero-phasesequence system addition. This signal can be directly coupled to a zero-phase-sequence system manipulator NP. The corrected phase signal waveforms of the first and second setpoint signal sets, provided at the output of the partial system characterizer TSB of FIG. 7, are identical to the waveforms shown in FIG. 6. This can be explained briefly based on FIG. 8. Here the instantaneous value of the first and second interval value AW1 and AW2 occurring at three units of time ZE, is represented in the shaded areas between the instantaneous maximum value of the phase signal waveforms and the upper scanning limit and between the instantaneous minimum value of the phase signal waveforms and the lower scanning limit. The first interval value AW1 is the distance between the maximum value of the waveform $U^*_S$ in the area B, and the upper scanning limit +1.0. Augmenting the waveforms $U^*_R$, $U^*_S$, $U^*_T$ in the area B by the first interval value AW1, creates the waveforms of the corrected phase signals $U^*_{RO}$, $U^*_{SO}$, $U^*_{TO}$ of the first setpoint signal set that conform with the representation of FIG. 6. In the area B, due to the correction, the phase signal waveform $U^*_{SO}$ is raised up or limited to the value of the upper scanning limit +1.0, while the waveforms of $U^*hd RO$ and $U^*_{TO}$ reach a minimum value.

Figure 9:
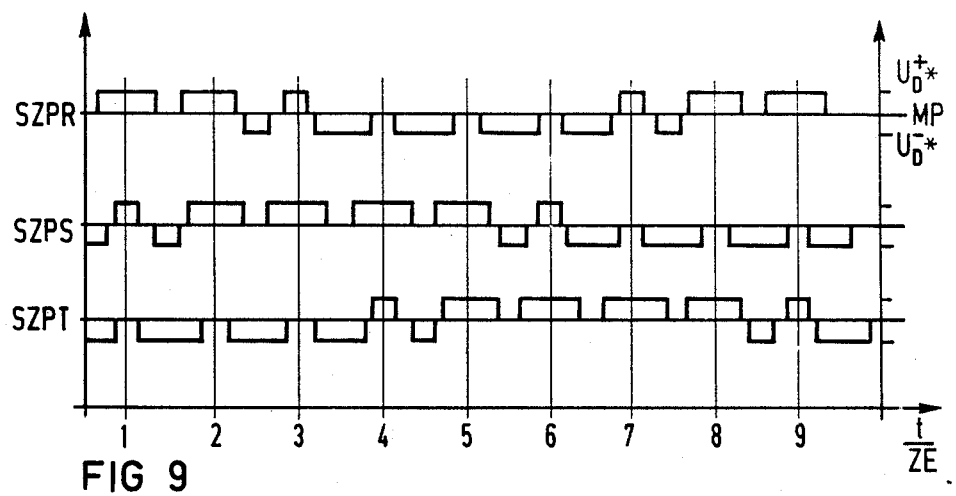
FIG. 9 shows the circuit state signals for the valves of a three-step inverter resulting from the modulation of the phase signal waveforms of FIG. 6 in accordance with the present invention.

In FIG. 9, circuit state signals SZPR, SZPS, SZPT are plotted for the individual phases PR, PS, PT. These circuit state signals are generated by scanning the corrected phase signal waveforms (FIGS. 6 or 8) produced accordingly to the embodiments of FIGS. 4 and 7. Thereby, at the output of the respective three-step inverter phase, for a positive status signal the positive potential $U_{D+}$ is coupled through to the inverter output; when a status signal is absent, the central potential MP is coupled through; and for a negative status signal, the negative potential $U_{D-}$ is coupled through. Thus, in the representation of FIG. 2, a positive status signal, the absence of a status signal, or a negative status signal corresponds to an upward, a horizontal, or a downward switch that characterizes the instantaneous circuit state of the respective phase in the possible circuit state combinations. These state combinations are denoted with numbers 1 to 27 in FIG. 2.

Figure 11A:
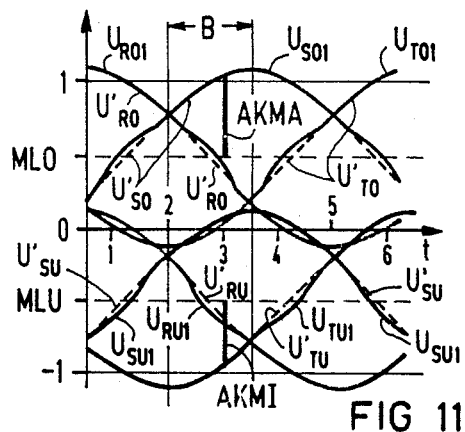
FIG. 11a, b show the phase signal waveforms having a modulation amplitude of A=0.53 that are formed using the embodiment of the partial system characterizer of FIG. 10.
Figure 11B:
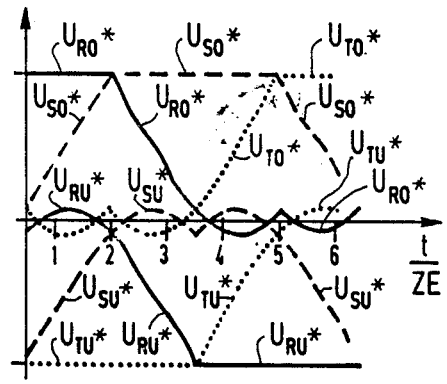

Another embodiment of the invention is shown in FIGS. 11a and 11b, which uses a modulation amplitude with the value A=0.53. The instantaneous value AKMA or AKMI, which is related to the respective median line MLO or MLU, determines the instantaneous maximum or minimum value of the particle phase signal waveforms which have a maximum or a minimum value beyond the scanning limits. As soon as the sum of these instantaneous values (AKMA and AKMI) exceeds half of the range of the modulation signal, the difference between this sum and half of the range of the modulation signal is added to the particular phase signal waveform in the first setpoint signal set that contains neither the instantaneous maximum nor the instantaneous minimum value of the waveforms in the first setpoint signal set over the area B. This difference is subtracted from the particular waveform in the second setpoint& signal set that contains neither the instantaneous maximum nor the instantaneous minimum value of the waveforms in the second setpoint signal set over the area B. For example, in area B in FIG. 11a, the phase signal waveform $U'_{SO}$ includes the instantaneous maximum value while phase signal waveform $U'_{TU}$ forms the instantaneous minimum value.

More specifically, the sum is formed from the amounts of the instantaneous values of the phase signal waveforms $U'_{SO}$ and $U'_{TU}$. In relation to the first or second median line MLO or MLU. Due to the modulation amplitude value A=0.53, which causes only a slight overload, this sum temporarily exceeds, only within the area B, half of the range of the modulation signal MS with the preferably standardized value 1. Therefore, compensation is made only inside area B with a first correction value KWI, which is equal to the difference of the above sum and half of the range of the modulation signal.

The first correction value KW1 compensates those phase signal waveforms in the first and second setpoint signal sets, which have neither the instantaneous maximum nor the instantaneous minimum values in their sets over the area B. In area B in FIG. 11a, this is the phase signal waveform $U'_{RO}$ in the first setpoint signal set and $U'_{RU}$ in the second setpoint signal set. According to the invention, the first correction value KW1 is added to the waveform of $U'_{RO}$ in the sense of an increase. This first correction value KWI is subtracted from the waveform $U'_{RU}$ in the sense of a decrease. Based on this correction, the phase signal waveforms of the first and second setpoint signal sets are slightly distorted in the areas around the respective median lines MLO or MLU. This distortion is apparent in FIG. 11a. The corrected phase signal waveforms $U_{RO1}$, $U_{SO1}$, $U_{T01}$ and $U_{RU1}$ $U_{SU1}$ $U_{TU1}$ are represented in FIG. 11a. These waveforms deviate slightly, due to the modulation amplitude value A=0.53, from the uncorrected phase signal waveforms $U'_{RO}$ $U'_{SO}$ $U'_{TO}$ and $U'_{RU}$ $U'_{SU}$ $U'_{TU}$, which are shown as a broken line in FIG. 11a and correspond to the waveforms of FIG. 3. If the corrected phase signal waveforms of FIG. 11a are further subjected to the additional correction already explained in FIGS. 4 to 9 for the purpose of increasing the linear range of amplitude modulation, then the corrected phase signal waveforms $U^*_{RO}$, $U^*_{SO}$, $U^*_{TO}$ and $U^*_{RU}$, $U^*_{SU}$, $U^*_{TU}$ represented in FIG. 11b are generated. These waveforms can be fed as input signals for further processing, for example, into the modulators MOS and MUS, shown in FIG. 1.

Figure 12A:
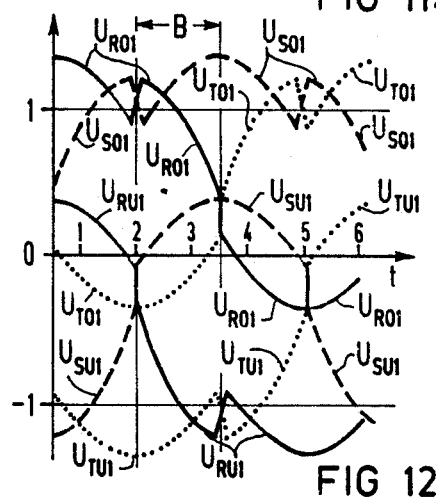
FIG. 12a, b and FIG. 13 show the phase signal waveforms having a modulation amplitude of A=0.75 that are formed using the embodiment of the partial system characterizer of FIG. 10.

FIG. 12a illustrates a correction, in accordance with the invention, using as an example, phase signal waveforms with a modulation amplitude of A=0.75. With this modulation amplitude, the sum from the amounts of the instantaneous maximum and minimum values always exceed half of the range of the modulation signal MS. Because of this, correction of the phase signal waveforms $U'_{RO}$ and $U'_{RU}$ would occur over the entire area B. In addition to this, the upper or lower deviation from the instantaneous maximum or minimum value of a waveform within an area is caused as a result of the correction of the phase signal waveform. For example, in the area B in FIG. 12a, by the addition of the first correction value KW1, the phase signal waveform of $U_{RO1}$ at the left end of the area B is enlarged to such an extent that it exceeds the previous maximum value $U_{SO1}$, represented with a dashed line. Similarly, by subtracting the first correction value, the phase signal waveform $U_{RU1}$ is reduced to such an extent, that on the right end of area B, it temporarily falls below the previous minimum value $U_{TU1}$ shown with dots. In another invention, the correction of the phase signal waveform forming neither the instantaneous maximum nor minimum value in the setpoint signal sets is limited so that the corrected waveform neither exceeds nor falls below the previous maximum or minimum values. Furthermore, the loss of signal height, caused by this limiting of the phase signal waveform, is compensated in the phase signal waveform corresponding to the limited phase signal waveform in the other setpoint signal set. This is described in more detail below.

Figure 12B:
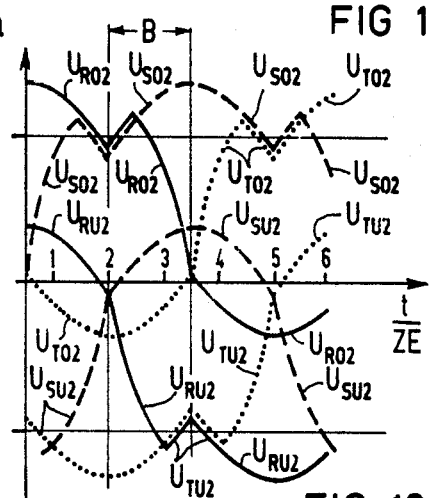
Figure 13:
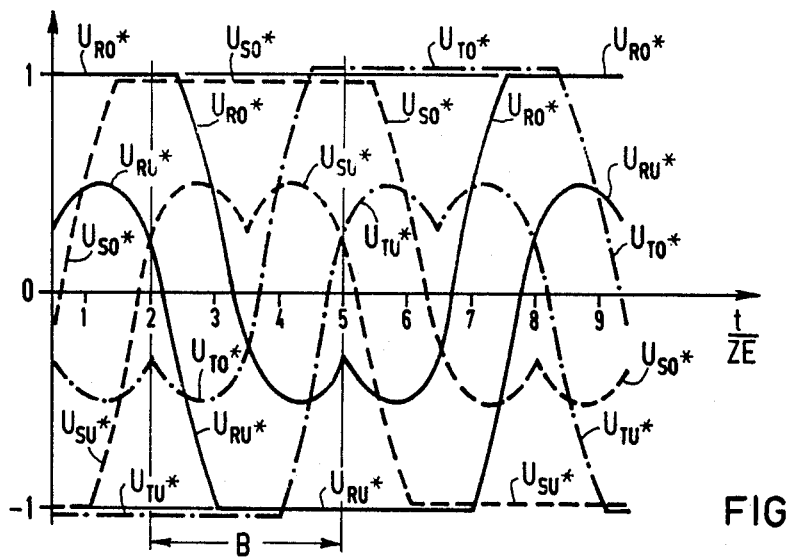

In FIG. 12b, the phase signal waveform $U_{RO2}$ at the left limit of area B temporarily conforms with the waveform of $U_{SO2}$ drawn with a dashed line. In the same way, at the right limit, the phase signal waveform $U_{RU2}$ is limited to the minimum waveform $U_{TU2}$ shown as a dotted line. The phase signal waveform $U_{RU2}$ at the left end of area B is increased, in a compensating sense, by the amount of the reduction of $U_{RO2}$ needed to limit $U_{RO2}$. In the same way, at the right edge of area B, the phase signal waveform of $U_{RO2}$ is reduced by the amount of the increase of $U_{RU2}$. Now, if the phase signal waveforms $U_{RO2}$, $U_{SO2}$, $U_{TO2}$ and $U_{RU2}$, $U_{SU2}$, $U_{TU2}$ are corrected and limited in accordance with FIG. 12b and then undergo the further correction, as explained previously with FIGS. 4 to 9, then to attain an increased linear range of modulation amplitude with a lower frequency of operating cycles, the phase signal waveforms develop that are depicted in FIG. 13. These waveforms show different slope curvatures compared to the corresponding waveforms of FIG. 6. In addition to this, all the phase signal waveforms of FIG. 13 extend over a larger range at either the value of the upper or lower scanning limit than that of the waveforms of FIG. 6. Thus, for example, the phase signal waveform $U^*_{SO}$ represented with a dashed line in FIG. 6, is at the value +1.0 of the upper scanning limit only within the area B. On the other hand, in FIG. 13, the corresponding phase signal waveform $U^*_{SO}$ has already reached the upper scanning limit before the beginning of the area B at two units of time ZE, and also is maintained at this limit past the end of the area B, at five units of time ZE.

Figure 14:
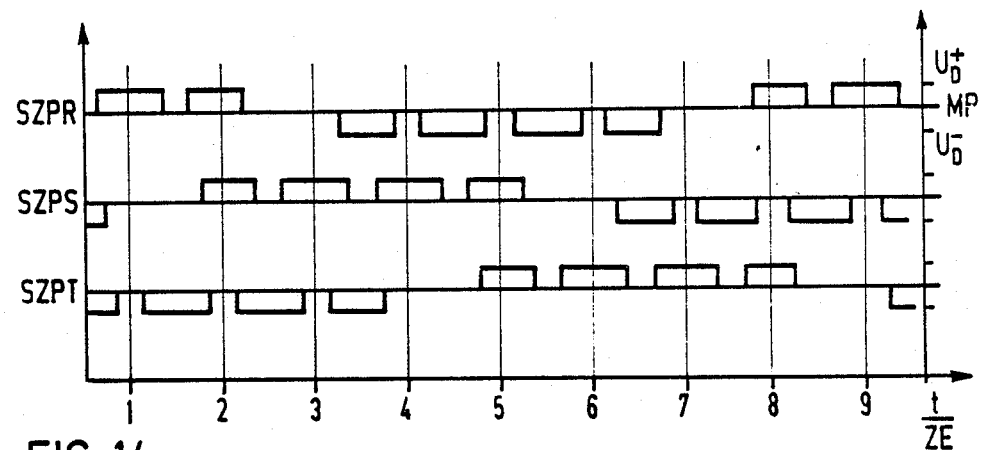
FIG. 14 shows the circuit state signals for the valves of a three-step inverter resulting from the modulation of the phase signal waveforms of FIG. 13 in accordance with the present invention.

When the phase signal waveforms of FIG. 13 are made available to the modulators MOS and MUS of FIG. 1 as input signals for further processing, then, as shown in FIG. 14, the circuit state signals SZPR, SZPS, SZPT are generated for the phases PR, PS, PT of the three-step inverter. A comparison with the circuit state signals represented in FIG. 9 shows that no changes take place in the circuit state signal, for example, in the status signal SZPR for the phase PR in the areas at three and seven units of time ZE in FIG. 14. This has the special advantage that, when using the corrected phase signal waveforms, in accordance with FIG. 13, to approximate any space vector, one does not need to switch back and forth as often between the permissible discrete space vector positions. Furthermore, to approximate such a space vector, only directly adjacent discrete space vector positions contribute to the modulation. If, for example, the voltage space vector $\underline{U^*}_2$ drawn in FIG. 2 is to be approximated, then when using the phase signal waveforms generated in accordance with the exemplified embodiment of FIG. 13, only those circuit states contribute that are situated on the corners of the triangle D1 surrounding the space vector peak. In the present example, these are the circuit states 15, 21, 9, 16, 22. These circuit states are passed through cyclically, for example, in the sequence 21, 22, 9, 15, 16, 15, 9, 22, 21.

With the described embodiment of the invention, it is impossible for circuit states which are not directly adjacent, for example the states I or 14, to contribute to the modulation of the voltage space vector $\underline{U}_2$. Thus, in the succession of circuit states, no detours occur, not even of short duration, over adjoining triangles, for example D2 or D3. Due to the fact that only directly adjacent circuit states contribute to the approximation of the space vectors, consequently every time there is a transition to another circuit state, only a single circuit change takes place in one of the three phases of the three-step inverter. For example, during the transition from circuit state 21 to 22, only the middle switch changes its state, and during the transition from circuit state 22 to circuit state 9, only the left switch changes its circuit state. Such a succession of circuit states produces a favorable harmonic spectrum in the electric signals at the output of the converter and within an electrical machine operated as a load. Thus, the harmonic spectrum contains a dominating, sinusoidal, fundamental oscillation.

Figure 10:
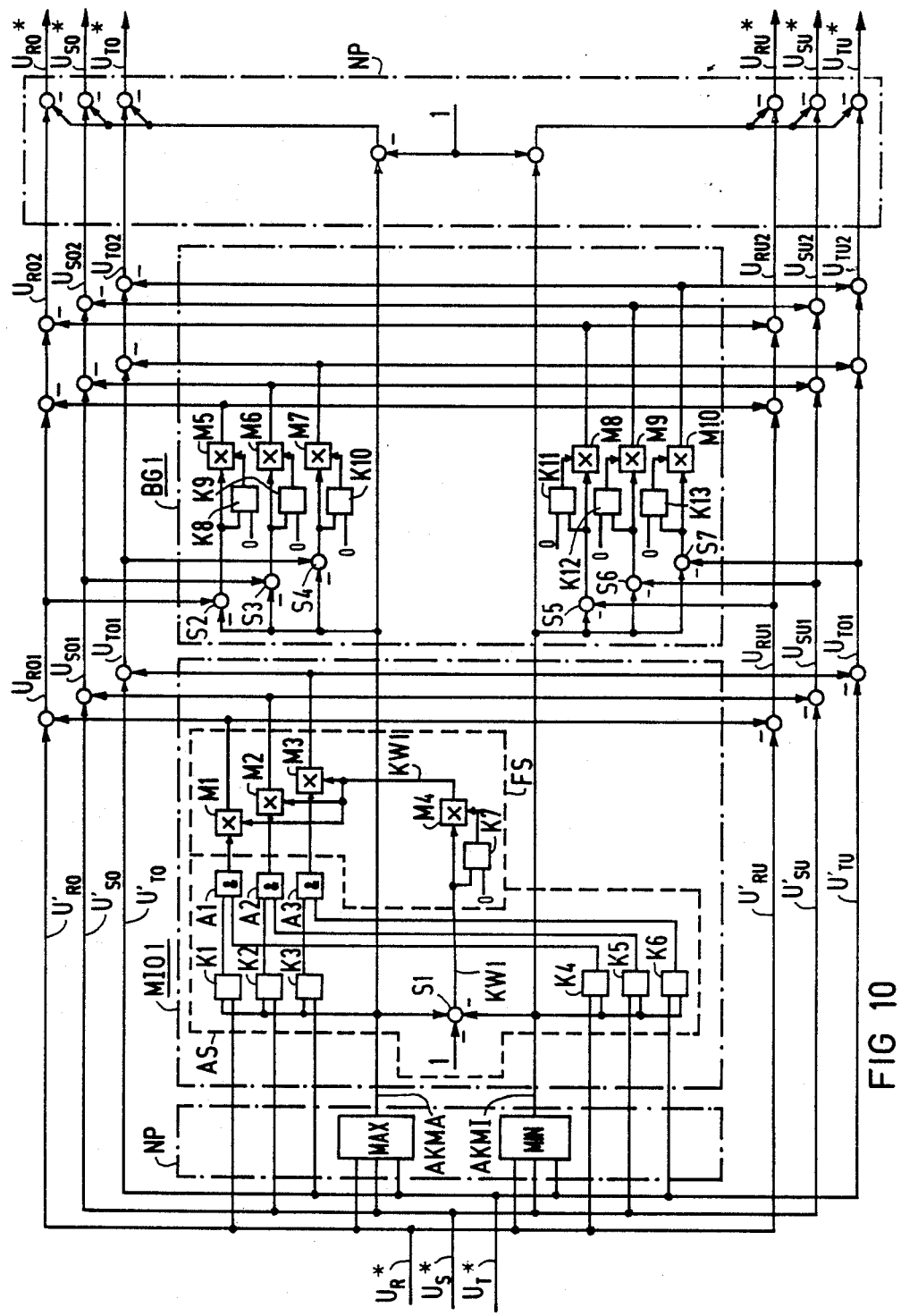
FIG. 10 is a block diagram of another embodiment of a partial system characterizer used in the three-step inverter of FIG. 1.

FIG. 10 shows a block diagram of an embodiment of a partial system characterizer TSB that can be used to manipulate the waveforms as described for FIGS. 11 to 13. This embodiment contains a zero-phase-sequence system manipulator NP, a first modulation pulse optimizer MI01 with a selector module AS and an enabled circuit FS, and a first limiter BG1.

The first modulation pulse optimizer MI01 corrects the three phase setpoint signal set $U^*_R$, $U^*_S$, $U^*_T$ which is input through a coordinate transformer KW (such as seen in FIG. 4). The first modulation pulse optimizer MI01 corrects the three phase setpoint signal set $U^*_R$, $U^*_S$, $U^*_T$ according to the diagrams of FIGS. 11a and 12a, so that corrected phase signal waveforms $U_{RO1}$, $U_{SO1}$, $U_{TO1}$ and $U_{RU1}$, $U_{SU1}$, $U_{TU1}$ are created for the first and second setpoint signal sets. For this purpose, the instantaneous maximum and minimum value of the phase signal waveforms are initially formed by detectors MAX and MIN in the first section of the zero phase sequence system manipulator NP. Subsequently, the first correction value KW1 in the selector module AS is formed at a first summing point S!. The sum is formed from the instantaneous maximum value AKMA and the instantaneous minimum value AKMI and reduced by half of the range of the modulation signal, which in the illustrated embodiment is equal to 1. The instantaneous maximum or minimum values are compared to the instantaneous values of the phase signal waveforms $U^*_R$, $U^*_S$, $U^*_T$, by comparators K1 to K6. Logic AND gates A1 to A3, which produce the logical product of the output signals of the comparators K1, K4 or K2, K5 or K3, K6 identify those phase signal waveforms which, neither in the first nor in the second setpoint signal sets, represent the instantaneous maximum or minimum value. These are the waveforms $U'_{RO}$, $U'_{RU}$ or $U'_{SO}$, $U'_{SU}$ or $U'_{TO}$, $U'_{TU}$. Thus, an output of one of the logic AND gates A1 to A3 will then show a logic 1 to identify this phase, which is identical in both setpoint signal sets. The first correction value KWI is determined to be positive or negative in the enabled circuit FS by a comparator K7 that compares the first correction value KW1 to the value zero. If KW1 is positive, the correction value KW1 is input by multipliers M1 to M4 onto the appropriate phase signal waveforms by the selector module AS for each of the first and second setpoint signal sets determined.

If, for example, as seen in FIG. 12a, this compensation leads to a deviation above or below the original maximum or minimum value, then this overshoot is limited to the value of the original maximum or minimum by a limiter BG1. For the first setpoint signal set relative to its median line, for example, a comparison is made using the summers S2 to S4 in the limiter BGI between the corrected phase signal waveforms $U_{RO1}$, $U_{SO1}$, $U_{TO1}$ at the output of the modulation pulse optimizer and the instantaneous maximum value AKMA. If the difference between one of the phase signal waveforms and the instantaneous maximum value AKMA exceeds the value 0, as detected by comparators K8, K9, K10, then the value of the overrange is subtracted, using multipliers M5, M6, M7, from the exceeding waveform $U_{RO1}$, $U_{SO1}$, $U_{TO1}$ of the first setpoint signal set to limit that waveform. This value of the overrange is also added to a corresponding phase signal waveform $U_{RU1}$, $U_{SU1}$, $U_{TU1}$ in the second setpoint signal set as a precontrol. A correction of the phase signal waveforms of the second setpoint signal set is made similarly using the summers S5, S6, S7 the comparators K11, K12, K13 and the multipliers M8, M9, M10, by comparing the corrected phase signal waveforms $U_{RU1}$, $U_{SU1}$, $U_{TU1}$ at the output of the modulation pulse optimizer MI01 to the instantaneous minimum value AKMI.

If the phase signal waveforms which are corrected using the limiter BGI are input to the second section of the zero phase sequence system manipulator NP, which is situated at the right end of the circuit-y of FIG. 10, then, as already described with the embodiments of FIGS. 4 and 7, corrected and limited phase signal waveforms $U^*_{RO}$, $U^*_{SO}$, $U^*_{TO}$ and $U^*_{RU}$, $U^*_{SU}$, $U^*_{TU}$ are generated in accordance with FIG. 13.

Figure 15:
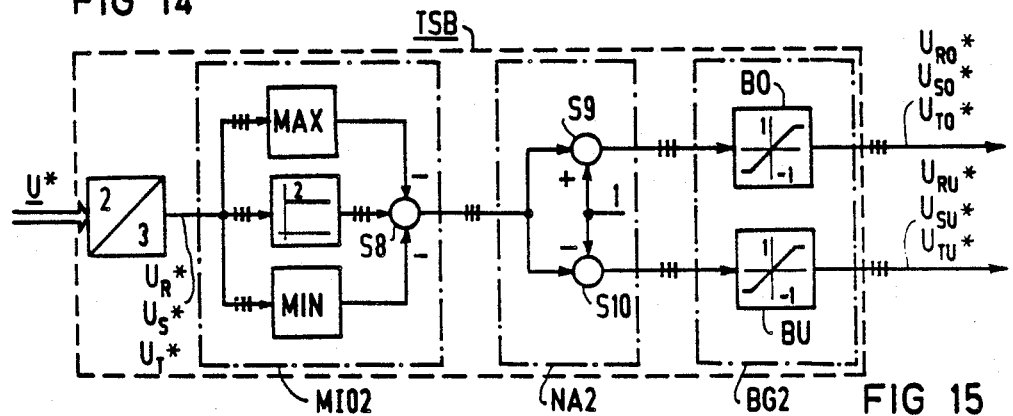
FIG. 15 is a block diagram of another partial system characterizer used in the three-step inverter of FIG. 1.

FIG. 15 is a block diagram of another embodiment of a partial system characterizer TSB. A voltage space vector $U^*$, is provided as a setpoint signal to the partial system characterizer TSB, and is initially converted in a coordinate transformer KW into a three-phased setpoint signal set with the phase signal waveforms $U^*_R$, $U^*_S$, $U^*_T$. As in the embodiment of FIG. 7, each of the phase signal waveforms $U^*_R$, $U^*_S$, $U^*_T$ represents one phase signal waveform belonging to a first and second setpoint signal set in accordance with double modulation. Therefore, the phase signal waveforms $U^*_R$, $U^*_S$, $U^*_T$ of a single, three-phased setpoint signal set varying around the zero line can be input twice into a second modulation pulse optimizer MI02. Also, the phase signal waveforms of two zero-shifted setpoint signal sets, shifted with respect to the median lines with the values +0.5 and −0.5, can be used, as in the embodiment of FIG. 3. However, for purposes of description, it is assumed the embodiment of FIG. 15, that a single, three-phased setpoint signal set, whose median line at the input lies on the zero line, is fed twice to the modulation pulse optimizer MI02. Each of the phase signal waveforms belonging to this setpoint signal set is thereby subjected to the same correction. For this purpose, the respective phase signal waveform is initially multiplied with the range of the modulation signal, which preferably has the value 2 in the standardized representation. Subsequently, at a three-phased summing point S8, the instantaneous maximum and minimum values of the phase signal waveforms are subtracted from the respective phase signal waveforms.

The corrected phase signal waveforms produced in this manner at the output of the modulation pulse optimizer MI02 are shifted by means of zero-shifting through a second zero phase sequence system adder NA2. The signals are shifted such that the median line of the phase signal waveforms of a first setpoint signal set conforms with the upper scanning limit, and the median line of the phase signal waveforms of a second setpoint signal set conforms with the lower scanning limit. For this purpose, in the embodiment of FIG. 15, the median lines of the phase signal waveforms at the output of the modulation pulse optimizer MI02 raised to the value of the upper scanning limit and lowered to the lower scanning limit. The median line is raised by adding half of the range of the modulation signal, that is by the value 1, at a three-phased summer S9. The media line is lowered to the value of the lower scanning limit by subtracting half of the range at a three-phased summer S10. The phase signal waveforms zero-shifted in this manner in the zero phase sequence system adder NA2 are limited to the value of the upper or lower scanning limit by a limiter BG2. The limited phase signal waveforms $U^*_{RO}$, $U^*_{SO}$, $U^*_{TO}$ and $U^*_{RU}$, $U^*_{SU}$, $U^*_{TU}$ are then provided at the output of the partial system characterizer TSB. These phase signal waveforms are represented in FIG. 16 using, as an example, a modulation amplitude A=0.75.

In another embodiment of the invention, not depicted, first and second setpoint signal sets having median lines MLO= +0.5 and MLU= −0.5 are supplied directly to a modulation pulse optimizer constructed of two identical sections MIO2 shown in FIG. 15. In this embodiment, the corrected phase signal waveforms $U^*_{RO}$, $U^*_{SO}$, $U^*_{TO}$ and $U^*_{RU}$, $U^*_{SU}$, $U^*_{TU}$ are provided within the scanning limits directly at the output of the modulation pulse optimizer. A zero phase sequence system in addition to zero phase sequence system adder NA2 is not required in this embodiment.

Figure 16:
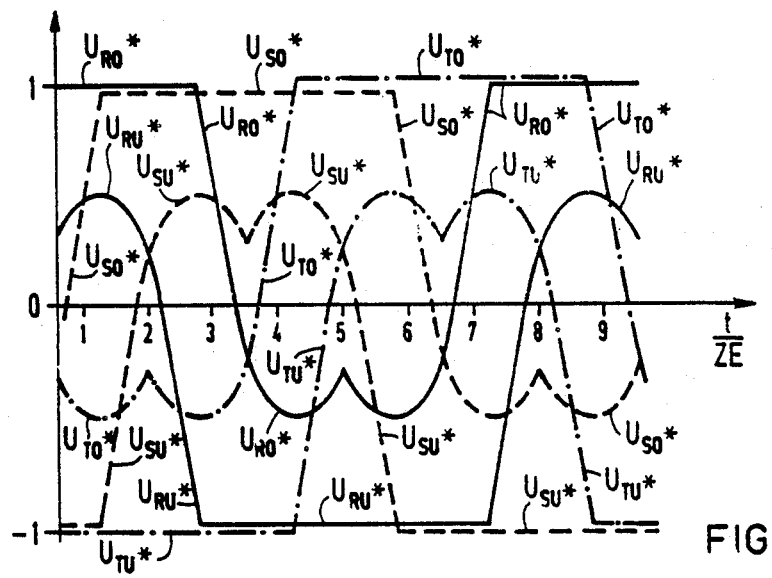
FIG. 16 illustrates optimized phase signal waveforms generated by the partial system characterizer of FIG. 15.

The circuit state signals for the phases of the three-step inverter produced by scanning the phase signal waveforms of FIG. 16 with the modulation signal MS have the advantage compared to the circuit state signals resulting from FIG. 13 and represented in FIG. 14, that the frequency of system transfers between adjacent, discrete space vector positions, which are necessary to approximate any specific space vector, is reduced further in the time average. The reason for this is that when redundant circuit states exist, which generate the same discrete voltage space vector, all of the possible circuit states in the cyclical circuit state succession no longer contribute to approximating a space vector. Thus, for example, the directly adjacent circuit states 21, 15, 9, 16 and 22 in FIG. 2 are available for example, to approximate the space vector $U^*_2$. However, of these, the circuit states 15, 21 or $\overline{16}$, 22 respectively generate an identical voltage space vector, at any one time on the α-coordinate axis or rotated 60° from it. In the above embodiment, only one of the two redundant circuit states generating the same discrete voltage space vector is contained in an approximating circuit state succession. For example, the voltage space vector $\underline{U}^*_2$ is now approximated as the result, for example, of cyclically switching between the discrete space vector positions 21, 22, 9 and 15.

Figure 17:
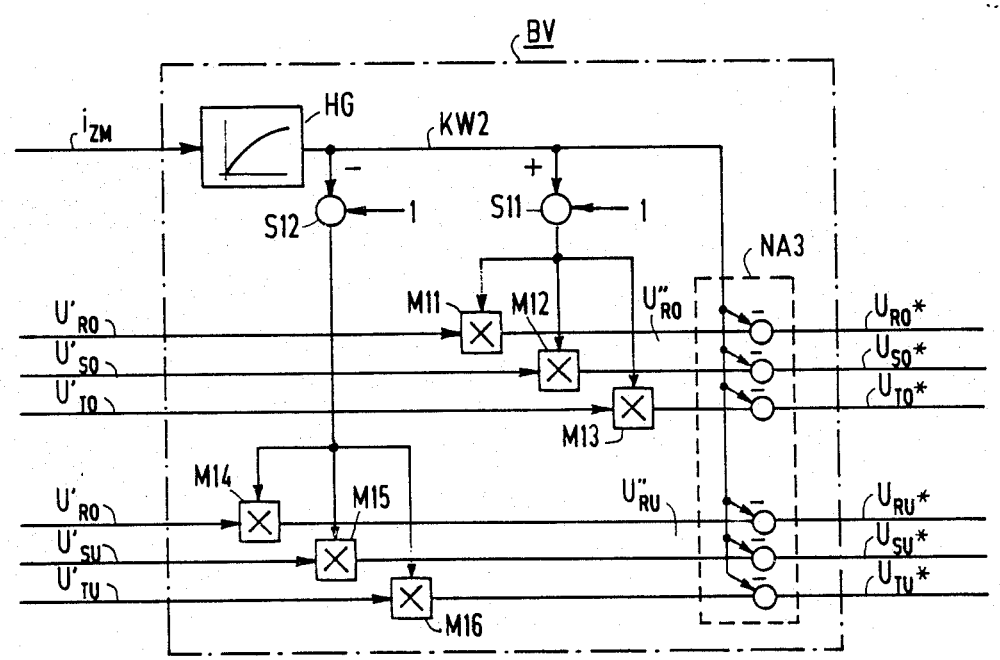
FIG. 17 is a block diagram of an embodiment of a load distributor usable with the partial system characterizers of FIGS. 4, 7, 10 and 15, an advantageous addition to the first or second operational method, according to the invention, in a block diagram representation.

Another embodiment of the invention is shown in FIGS. 17 and 18a, b, c. In this embodiment, where there is a temporary, different loading of the positive and negative potentials $U_{D+}$ and $U_{D-}$ of the direct voltage source, a compensation may be affected through the phases of the three-step inverter For example, it is possible, in accordance with FIG. 1, that the current $i_P$ flowing from the positive potential connection $U_{D+}$ into the three-step inverter is temporarily greater than the current $i_N$ flowing from the three-step inverter into the negative potential connection $U_{D-}$. In such a case, an intermediate circuit current $i_Z$ flows as shown in FIG. 1, from the three-step inverter into the central potential connection MP, where the sum of the currents $i_Z$ and $i_N$ is equal to the current $i_p$.

In the embodiment of FIG. 1, such an asymmetrical loading of the direct voltage source $U_D$ results in a discharging or recharging of the intermediate circuit capacitor C1 or C2, so that the voltage $U_{C1}$ on the capacitor C1 becomes less than the voltage $U_{C2}$ on the capacitor C2. This leads to an unwanted displacement of the potential on the location MP.

To equalize such an uneven loading, in accordance with the invention, the three-step inverter is temporarily controlled as a function of the (plus or minus) sign and the amount of the smoothed intermediate circuit current. In the above example, the bottom half of the three-step inverter phase temporarily contributes more to forming the inverter output signals. A second correction value is formed as a function of the (plus or minus) sign and the amount of the intermediate circuit current between the central potential connection MP and the three-step inverter. In a standardized representation, this second correction value has a value of between $-1$ and $+1$.

The phase signal waveforms of the first setpoint signal set are multiplied now with the sum from the second correction value and half of the range of the modulation signal, which, in the standardized representation, has the value 1. By contrast, the phase signal waveforms of the second setpoint signal set are multiplied by the difference from half of the range of the modulation signal and the second correction value. The phase signal waveforms, thus adjusted, are zero-shifted by subtracting the second correction value. This method will be explained in greater detail below with reference to FIGS. 18a, b, c.

It is assumed as before, that the three-step inverter brings the positive potential $U_{D+}$ temporarily on to load more than the negative potential $U_{D-}$. The smoothed intermediate circuit current has the direction as shown in FIG. 1 and the standardized value $i_{ZM} = +0.5$. The phase signal waveforms $U'_{RO}$, $U'_{RU}$ of the phase R of the first and second setpoint signal sets are shown as an example in the top portion of FIG. 18a. These phase signal waveforms $U'_{RO}$, $U'_{RU}$ are multiplied respectively in accordance with the invention, with the factors $1+0.5=1.5$ and $1-0.5=0.5$. The resulting phase signal waveforms $U''_{RO}$, $U''_{RU}$ are depicted in FIG. 18b. In the last step, these phase signal waveforms are shifted downward by the magnitude of the second correction value 0.5, to generate the phase signal waveforms $U^*_{RO}$, $U^*_{RU}$, as depicted in the top portion of FIG. 18c. The increase or decrease in the amplitude of the phase signal waveform belonging to the first and second setpoint signal set and the subsequent shifting of the phase signal waveforms in accordance with the amount and the (plus or minus) sign of the second correction value produces an unloading of the positive potential $U_{D+}$, originally brought more vigorously on to load, of the direct voltage source. This can be inferred from a comparison of the circuit state signals SZPR for the phase PR of the three-step inventer, depicted in the lower section of FIG. 18a and 18c. While the duration of the positive and negative switching pulses in the lower section of FIG. 18a are almost the same, i.e., the positive and the negative potentials $U_{D+}$ and $U_{D-}$ in the center are almost equally connected through to the output of the phase PR. The sum of the positive switching pulses in FIG. 18c is considerably less than that of the negative switching pulses. The comparison of FIG. 18a and 18c shows that the same number of positive and negative pulses occur with identical time related median lines. However, the positive or negative pulses in FIG. 18c have a shorter or longer duration than the corresponding pulses in FIG. 18a. This results in the negative potential $U_{D-}$ of the direct voltage source temporarily being subjected to a more concentrated loading, according to the invention, to compensate a previously more concentrated loading of the positive potential $U_{D+}$.

FIG. 17 is a block diagram of an embodiment, load distributor BV to perform the above method. The load distributor BV is used to supplement a partial system characterizer TSB. Thus, the embodiments of the partial system characterizer TSB depicted in FIGS. 4, 7 or 10 can be easily coupled to the input side of the load distributor BV. The output signals of the partial system characterizer TSB are then supplied to the load distributor BV as input signals $U'_{RO}$, $U'_{SO}$, $R'_{TO}$ and $U'_{RU}$, $R'_{SU}$, $R'_{TU}$, while the output signals of the load distributor $U^*_{RO}$, $U^*_{SO}$, $U^*_{TO}$ and $U^*_{RU}$, $U^*_{SU}$, $U^*_{TU}$ are provided to the modulators MOS and MUS of FIG. 1 as input signals for further processing in the firing circuit subassembly.

In the load distributor BV, the second correction value KW2 corresponds to the preferably standardized and time averaged measured value $i_{zm}$ of the intermediate circuit current $i_Z$, which is preferably smoothed by a smoothing element HG. At a summing point S11, the sum from the second correction value KW2 and the preferably standardized half range of the modulation signal MS is formed. With this sum, the phase signal waveforms of the first setpoint signal set are subsequently multiplied by multipliers M11, M12, M13. Accordingly, at a further summing point S12, the difference from half of the range of the modulation signal MS and the second correction value KW2 is formed and, by means of the multipliers M14, M15, M16, it is used to evaluate the phase signal waveforms of the setpoint signal set. Thus, at the output of the multiplier M11 or M14, the phase signal waveforms $U''_{RO}$ or $U''_{RU}$ are produced, as depicted as an example in FIG. 18b. Finally, to form the output signals of the load distributor BV, the thus corrected phase signal waveforms are reduced by the second correction value KW2 in a third zero phase sequence system adder NA3.

What is claimed:

1. A method of forming firing pulses for valves in phases of a three-step inverter comprising:
providing first and second cophasal setpoint signal sets, each setpoint signal set having sinusoidal phase signal waveforms with median lines, the median line for the phase signal waveforms of the first setpoint signal set being greater than or equal to the median line for the phase signal waveforms of the second setpoint signal set;
providing a modulation signal having a range that defines upper and lower scanning limits;
forming a first interval value representing a difference between an instantaneous maximum value of the phase signal waveforms of the first setpoint signal set and the upper scanning limit;
forming a second interval value representing a difference between an instantaneous minimum value of the phase signal waveforms of the second setpoint signal set and the lower scanning limit;
decreasing the phase signal waveforms of the first setpoint signal set by the first interval value when the phase signal waveforms of the first setpoint signal set are greater than the upper scanning limit; and
increasing the phase signal waveforms of the second setpoint signal set by the second interval value when the phase signal waveforms of the second setpoint signal set are less than the lower scanning limit; and scanning the phase signal waveforms of the first and second setpoint signal sets with said modulation signal.

2. The method of claim 1, further comprising:

increasing the phase signal waveforms of the first setpoint signal by the first interval value when the phase signal waveforms of the first setpoint signal set are less than the upper scanning limit; and decreasing the phase signal waveforms of the second setpoint signal set by the second interval value when the phase signal waveforms of the second setpoint signal set are greater than the lower scanning limit.

3. The method of claim 1, further comprising:

forming a sum from the amount of the instantaneous maximum value relative to the median line for the phase signal waveforms of the first setpoint signal set, and the amount of the instantaneous minimum value relative to the median line for the phase signal waveforms of the second setpoint signal set;

forming a first correction value from a difference between said sum and one half of said range of the modulation signal when said sum is greater than one half of said range;

adding said first correction value to the particular phase signal waveforms in the first setpoint signal set that have neither the instantaneous maximum value nor the instantaneous minimum value of the phase signal waveforms in the first setpoint signal set; and subtracting said first correction value from the particular signal waveforms in the second setpoint signal set that have neither the instantaneous maximum value nor the instantaneous minimum value of the phase signal waveforms in the second setpoint signal set.

4. The method of claim 3, further comprising:

forming a first amount by subtracting the instantaneous maximum value of the phase signal waveforms in the first setpoint signal set from the particular phase signal waveform in the first setpoint signal set after said adding step;

limiting the particular phase signal waveform in the first setpoint signal set after said adding step to the instantaneous maximum value by subtracting the first amount;

adding the first amount to the particular waveform in the second setpoint signal set;

forming a second amount by subtracting the particular phase signal waveform in the second setpoint signal set after said subtracting step from the instantaneous minimum value of the phase signal waveforms in the second setpoint signal set;

limiting the particular phase signal waveform in the second setpoint signal set after said subtracting step to the instantaneous minimum value by adding the second amount; and subtracting the second amount from the particular waveform in the first setpoint signal set.

5. The method of claim 1, wherein the three-step inverter is supplied by a direct voltage source with central, positive and negative potentials, with an intermediate-circuit current, having a sign and an amount, flowing in the central potential, and further comprising:

forming a second correction value as a function of the sign and the amount of the intermediate-circuit current;

adding the second correction value to half of said range of the modulation signal to form a first sum;

subtracting the second correction value from half of said range of the modulation signal to form a first difference;

multiplying instantaneous values of the phase signal waveforms of the first setpoint signal set with the first sum to form a first set of multiplied phase signal waveforms;

multiplying instantaneous values of the phase signal waveforms of the second setpoint signal set with the first difference to form a second set of multiplied phase signal waveforms; and subtracting said second correction value from said first and second sets of multiplied phase signal waveforms.

6. A method of forming firing pulses for valves in phases of a three-step inverter, comprising:

providing first and second cophasal setpoint signal sets, each setpoint signal set having sinusoidal phase signal waveforms with median lines, the median line for the phase signal waveforms of the first setpoint signal set being greater than or equal to the median line for the phase signal waveforms of the second setpoint signal set;

providing a modulation signal having a range that defines upper and lower scanning limit;

forming a first difference between an instantaneous maximum value of the phase signal waveforms of the first setpoint signal set and the median line for the phase signal waveforms of the first setpoint signal set;

forming a second difference between an instantaneous minimum value of the phase signal waveforms of the second setpoint signal set and the median line for the phase signal waveforms of the second setpoint signal set;

multiplying the phase signal waveforms of the first setpoint signal set with the range of the modulation signal;

multiplying the phase signal waveforms of the second setpoint signal set with the range of the modulation signal;

subtracting the first difference from the multiplied phase signal waveforms of the first and second setpoint signal sets;

subtracting the second difference from the multiplied phase signal waveforms of the first and second setpoint signal sets;

zero-shifting the phase signal waveforms of the first setpoint signal set so that the median line of the phase signal waveforms of the first setpoint signal set is at the upper scanning limit; and zero-shifting the phase signal waveforms of the second setpoint signal set so that the median line of the phase signal waveforms of the second setpoint signal set is at the lower scanning limit; and scanning the phase signal waveforms of the first and second setpoint signal sets with said modulation signal.

7. The method of claim 6, further comprising:

limiting the phase signal waveforms of the first setpoint signal set to the upper scanning limit; and limiting the phase signal waveforms of the second setpoint signal set to the lower scanning limit.

8. The method of claim 6, wherein the modulation signal has a triangular waveform.

9. The method of claim 1, wherein the modulation signal has a triangular waveform.

* * * * *